2 Sheets—Sheet 1.
J. E. CROWELL.
FLAX CLEANING AND DRESSING MACHINE.
No. 36,075. Patented Aug. 5, 1862.
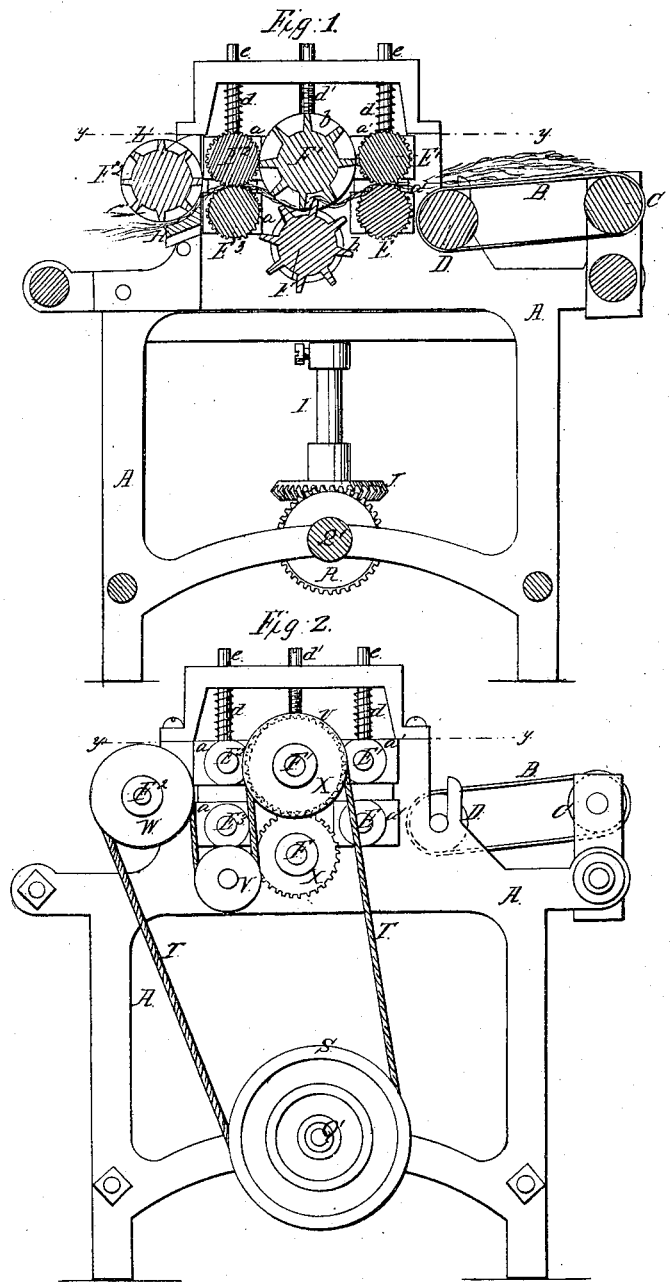

2 Sheets—Sheet 2.

J. E. CROWELL.
FLAX CLEANING AND DRESSING MACHINE.

No. 36,075. Patented Aug. 5, 1862.

UNITED STATES PATENT OFFICE.

J. E. CROWELL, OF CHELSEA, MASSACHUSETTS.

IMPROVEMENT IN FLAX CLEANING AND DRESSING MACHINES.

Specification forming part of Letters Patent No. 36,075, dated August 5, 1862.

*To all whom it may concern:*

Be it known that I, J. E. CROWELL, of Chelsea, in the county of Suffolk and State of Massachusetts, have invented a new and useful Improvement in Machines for Dressing and Cleaning Flax and other Fibrous Materials; and I do hereby declare that the following is a full, clear, and exact description of the same, reference being had to the accompanying drawings, forming a part of this specification.

Figure 3:
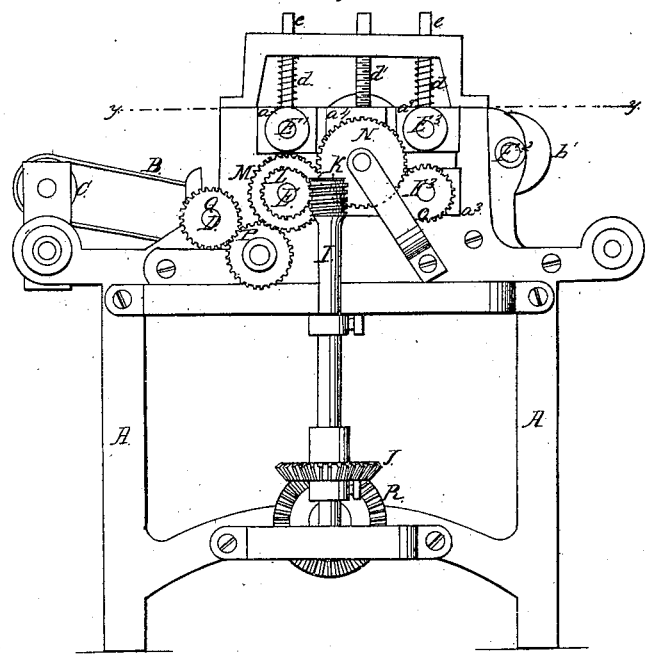
Figure 4:
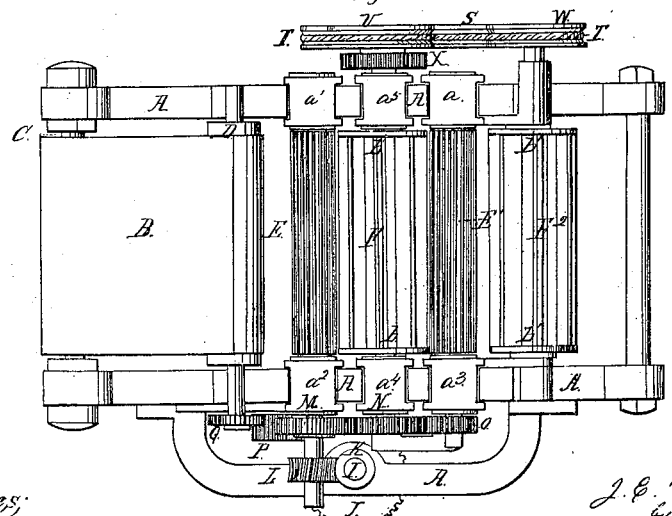

Figure 1 is a vertical longitudinal section of the improved machine. Fig. 2 is a view of one side of the same, and Fig. 3 a view of the other side thereof. Fig. 4 is a horizontal section in the line $y\ y$ of Figs. 1, 2, and 3.

Similar letters of reference in the several figures indicate corresponding parts.

My invention consists in a machine for dressing and cleaning flax and other fibrous substances, said machine comprising slowly-moving fluted rollers and rapidly-moving beaters, pairs of the former being arranged both behind and in front of pairs of the latter in one part of the machine, and one of the latter behind the rear pair of the former and in close relation to a concave plate in another part of the machine, and the whole operated by a new arrangement of gearing, all substantially as hereinafter described, and so that the substances treated may be left in a condition to be carded and spun the same as cotton or wool, or in long staple, as may be desired.

To enable others skilled in the art to make and use my invention, I will proceed to describe its construction and operation.

A is the frame of the machine, and B a feed-apron at the front upper end of the same. This apron runs around a friction-roller, C, and a geared roller, D.

E E' E² E³ are two pairs of fluted feed or drawing rollers, and F F' a pair of beaters, with end disks or plates, $b\ b$, and arranged between the rollers E E' and E² E³, so as to revolve freely. The feed-rollers and the beaters have their axles fitted in slide-boxes $a\ a'$ $a^2\ a^3\ a^4\ a^5$, which are fitted loosely in openings formed in the top rails or side plates of the frame A, about as shown.

F² is a beater with solid shaft and end pieces or heads, $b'\ b'$. It is arranged opposite the meeting-line of the feed-rollers E² E³, and in rear of said rollers.

H is a concave plate placed firmly under the beater F² in an inclined position. The beater F² revolves in close contact with this plate. The beaters have their blades set radially, and F F' are set far enough apart to allow the flax and the blades of one beater to enter loosely the spaces existing between every pair of blades of another, and to move out of the same without contact with anything but the flax. The ends of the blades and the spaces between them are inclosed by the disks $b\ b$ to a greater or less extent, as may be desired, and the disk of one beater rests upon the disk of another beater. Thus the blades may be restricted as to the depth they may enter into the spaces whenever the beaters are not adjusted beyond a certain point, readily working toward the bearings or journals of the beaters. The red color designates the flax.

To produce the motions in the fluted or drawing rollers E E' E² E³, which are very slow compared with the speed of the beaters, a vertical shaft, I, with bevel-wheel J at its bottom, and worm K at its top, is arranged on one side of the frame A. The worm gears with a screw-wheel, L, of the lower feed-roller, E, and a pinion, M, of said roller gears with an intermediate spur-wheel, N, which in turn gears with a pinion, O, of the feed-roller E³, said pinion being smaller than the pinion M, so as to slightly accelerate the speed of the back set of feed or drawing rollers E² E³. It should be here mentioned that the pinion M gears with a long idle-pinion, P, which in turn gears with a pinion, Q, of the rear apron-roller, D.

To produce a rapid motion in the beaters F F' F², and to actuate the gearing just described, a driving or counter shaft, Q', is arranged across the lower part of the frame, carrying on one end a bevel-wheel, R, which gears with the bevel-wheel J, and on the other end a grooved pulley, S. From this pulley a belt, T, passes up to and nearly around a smaller grooved pulley, U, of the upper beater, F', and down under an idle-pulley, V, and up to and nearly around a pulley, W, of the beater F². This belt sets the beaters F F' F² in motion, the beaters F F' having pinions X on one end of their shafts, said pinions gearing into one another and causing the beaters F F' to move at rapid uniform speeds; and simultaneously with the revolution of the beaters the feed or drawing rollers are set in motion through the bevel-wheel R and the intermediate gearing.

In order that the feed-rollers may act with force and yet not be rigid, springs $d\,d$, arranged upon rods $e\,e$, are placed between the top rails of the frame A and the boxes $a\,a'\,a^2\,a^3$; and in order that the beaters may be held down to their work set-screws $d'$ are placed above the boxes $a^4\,a^5$, said screws being tapped in the top rails of the frame.

The machine as described is adapted for producing short-staple flax; and to make it capable of producing long-staple flax the gears M O must be substituted by gears of uniform sizes, so that the draft and feed rollers shall revolve at equal speeds. It is obvious that with the gears M O the staple or fiber of the flax will have short breaks in it by reason of the draft-rollers revolving faster than the feed-rollers; but with the proposed change in the gears these short breaks will not be produced in the staple or fiber, because the feed and draft rollers are equal as to speeds.

The operation is as follows: The flax or other fibrous material is moved up between the first pair of feed-rollers by the endless apron, and is carried forward by said rollers to the first pair of beaters, which in their revolution beat out all hard and extraneous substances. From the beaters it passes to the second set of feed or drawing rollers, which carry it between the concave and the rear beater. Here it is again beaten or whipped upon the concave by the blades of the beater. From this point it passes in a cleaned and dressed condition, ready for being carded or spun the same as cotton or wool, or in long staple, as may be desired.

It will be evident that the slow and different speeds of the two sets of feed or drawing rollers insures a slight tension upon the flax or other substance, and especially so as both sets of rollers are held down by a spring force, and therefore the flax or other material is presented to the beaters in the most proper manner for "bowing" or being whipped and freed of its hard foreign substances, which while in it render it unfit for being spun. It also, after being whipped or "bowed," has a free escape from the beaters, because the beaters are so set and geared that the blade of one always stands centrally between two blades of the other, and a passage between all parts of the blades is left for the flax to escape or be fed through.

It is obvious that any number of pairs of beaters and of feed-rollers may be used in a machine by introducing additional gear-wheels and pulleys.

What I claim as my invention, and desire to secure by Letters Patent, is—

1. The combination of the slow rollers $E\,E'$, beaters $F\,F'$, fast rollers $E^2\,E^3$, and beaters $F^2$ with its concave H, the whole constructed and arranged and operated in the manner and for the purpose substantially as herein described.

2. The bladed beaters F F', constructed as specified, and operating in pairs in the manner described, in combination with the draw-rollers $E^2\,E^3$ and beater $F^2$, with its concave H, substantially as and for the purpose set forth.

3. Delivering the cleaned and partly-dressed flax from a machine operating, substantially as described, directly upon a fixed concave, H, and under a revolving bladed beater, F, of the construction and arrangement described, substantially in the manner and for the purpose set forth.

JAMES E. CROWELL.

Witnesses:
 DENNIS SLATTERY,
 BENJAMIN POND.